(12) United States Patent
Dotan

(10) Patent No.: US 6,311,609 B1
(45) Date of Patent: Nov. 6, 2001

(54) FOOD HEATING APPLIANCE PARTICULARLY USEFUL AS A BREAD TOASTER

(75) Inventor: Simon Dotan, Natania (IL)

(73) Assignee: Home Care Technologies Ltd., Central (HK); a part interest (\*) Notice: Subject to any disclaimer, the term of this patent is extended or adjusted under 35 U.S.C. 154(b) by 0 days.

(21) Appl. No.: 09/787,537

(22) PCT Filed: Jan. 10, 2000

(86) PCT No.: PCT/IL00/00020

§ 371 Date: Mar. 19, 2001

§ 102(e) Date: Mar. 19, 2001

(87) PCT Pub. No.: WO00/41606

PCT Pub. Date: Jul. 20, 2000

Related U.S. Application Data

(60) Provisional application No. 60/115,487, filed on Jan. 11, 1999.

(51) Int. Cl.[7] ............................................. A47J 37/08
(52) U.S. Cl. .............. 99/327; 99/329 P; 99/329 RT; 99/385; 99/388; 99/389; 99/391; 219/521
(58) Field of Search ............... 99/325–335, 385–399, 99/400, 401; 219/386, 400, 520, 521, 544; 392/433

(56) References Cited

U.S. PATENT DOCUMENTS

| | | | | |
|---|---|---|---|---|
| 2,576,632 | \* | 11/1951 | Myers | 99/385 X |
| 4,290,349 | \* | 9/1981 | Fiorenza | 99/388 |
| 5,156,637 | \* | 10/1992 | Wai-Ching | 99/391 X |

\* cited by examiner

*Primary Examiner*—Timothy F. Simone

(57) ABSTRACT

A food handling appliance particularly useful as a toaster, includes a food compartment for receiving a food article to be heated, at least one heating element (43b) located laterally of the food compartment for heating a food article therein, and a heat transfer-plate (44) located between the food article compartment and the heating element (43b). When the appliance is a toaster for toasting a slice of bread, there would be two heating elements and two heat-transfer plates for toasting the opposite side of a slice of bread mounted on a pop-up stand with the heat transfer plates being brought into contact with the slice of bread when the stand is in its lower position, and being moved out of contact therewith when the stand is in its upper position.

24 Claims, 5 Drawing Sheets

FOOD HEATING APPLIANCE PARTICULARLY USEFUL AS A BREAD TOASTER

This application is a 371 of PCT/IL00/00020 filed Jan. 10, 2000, which claims benefit of Provisional No. 60/115,487 filed Jan. 11, 1999.

FIELD AND BACKGROUND OF THE INVENTION

The present invention relates to food heating appliances. The invention is particularly useful as a bread toaster, and is therefore described below with respect to such an application.

OBJECTS AND BRIEF SUMMARY OF THE INVENTION

An object of the present invention is to provide a food heating appliance capable of heating a food article efficiently and in a relatively short period of time. Another object of the invention is to provide a food heating appliance particularly useful as a bread toaster capable of toasting bread in a relatively short period of time.

According to one aspect of the present invention, there is provided a food heating appliance, comprising: a food compartment for receiving a food article to be heated; at least one heating element located laterally of the food compartment for heating a food article therein; and a heat-transfer plate located between the food article compartment and the heating element; the heat-transfer plate being blackened to absorb heat from the heating element, and being of a corrugated construction having projecting surfaces to contact the food article when received in the compartment for transferring heat to the food article by conduction, alternating with recessed surfaces spaced from the food article and formed with openings for transferring heat to the food article by radiation and convection.

The food heating appliance is particularly useful as a bread toaster, in which case there would be two heating elements and two heat-transfer plates located on the opposite sides of the food article compartment. In addition, the food article compartment is oriented vertically to receive a slice of bread to be toasted.

According to another aspect of the present invention, therefore, there is provided a bread toaster, comprising: a pop-up stand movable to an upper loading-unloading position and to a lower toasting position in a bread compartment for receiving a slice of bread to be toasted; a pair of heating elements located on opposite sides of the bread compartment for toasting a slice of bread on the pop-up stand; and a pair of heat-transfer plates on opposite sides of the bread compartment between the heating element thereat and the slice of bread to be toasted; the heat-transfer plates being brought into contact with the slice of bread on the pop-up stand when the pop-up stand is in its lower position, and being moved out of contact with the slice of bread when the pop-up stand is in its upper position.

Further features and advantages of the invention will be apparent from the description below.

BRIEF DESCRIPTION OF THE DRAWINGS

The invention is herein described, by way of example only, with reference to the accompanying drawings, wherein.

and

Figure 5:
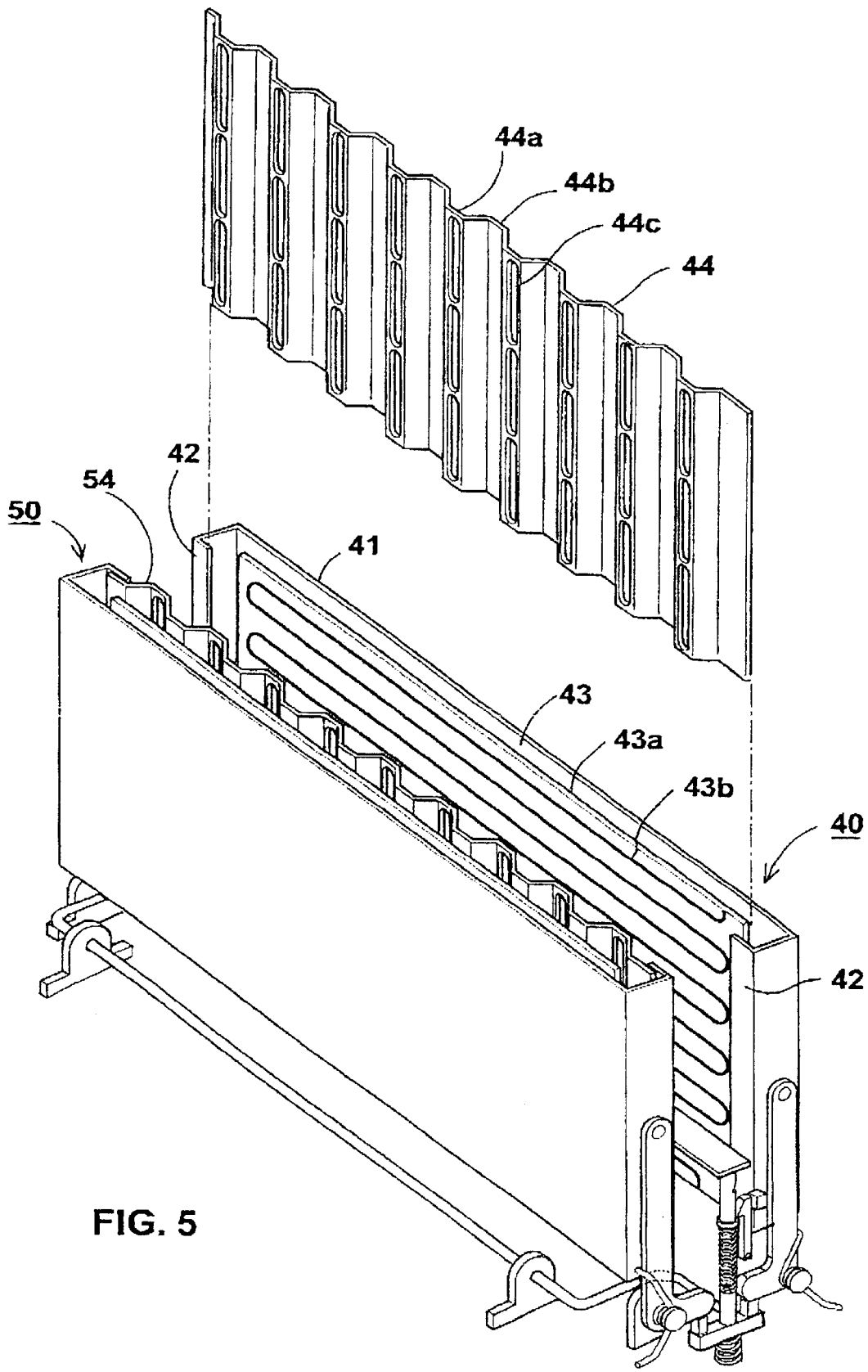
FIG. 5 is an exploded perspective view illustrating the invention embodied in a pop-up toaster for toasting slices of bread.
Figure 9:
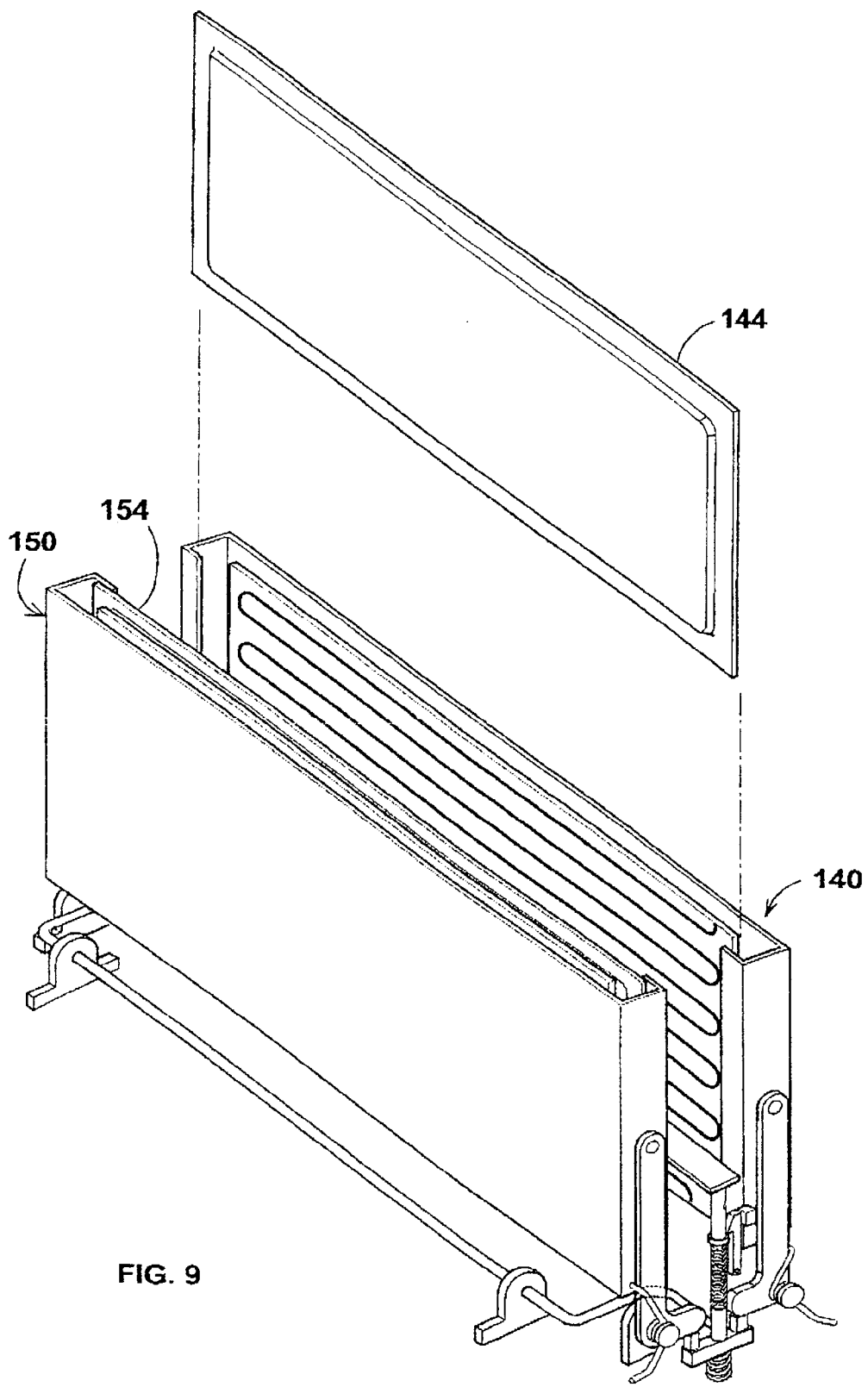

FIG. 9 is a view similar to that of FIG. 5 but illustrating a modification in the construction of the pop-up toaster.

DESCRIPTION OF A PREFERRED EMBODIMENT

Figure 1:
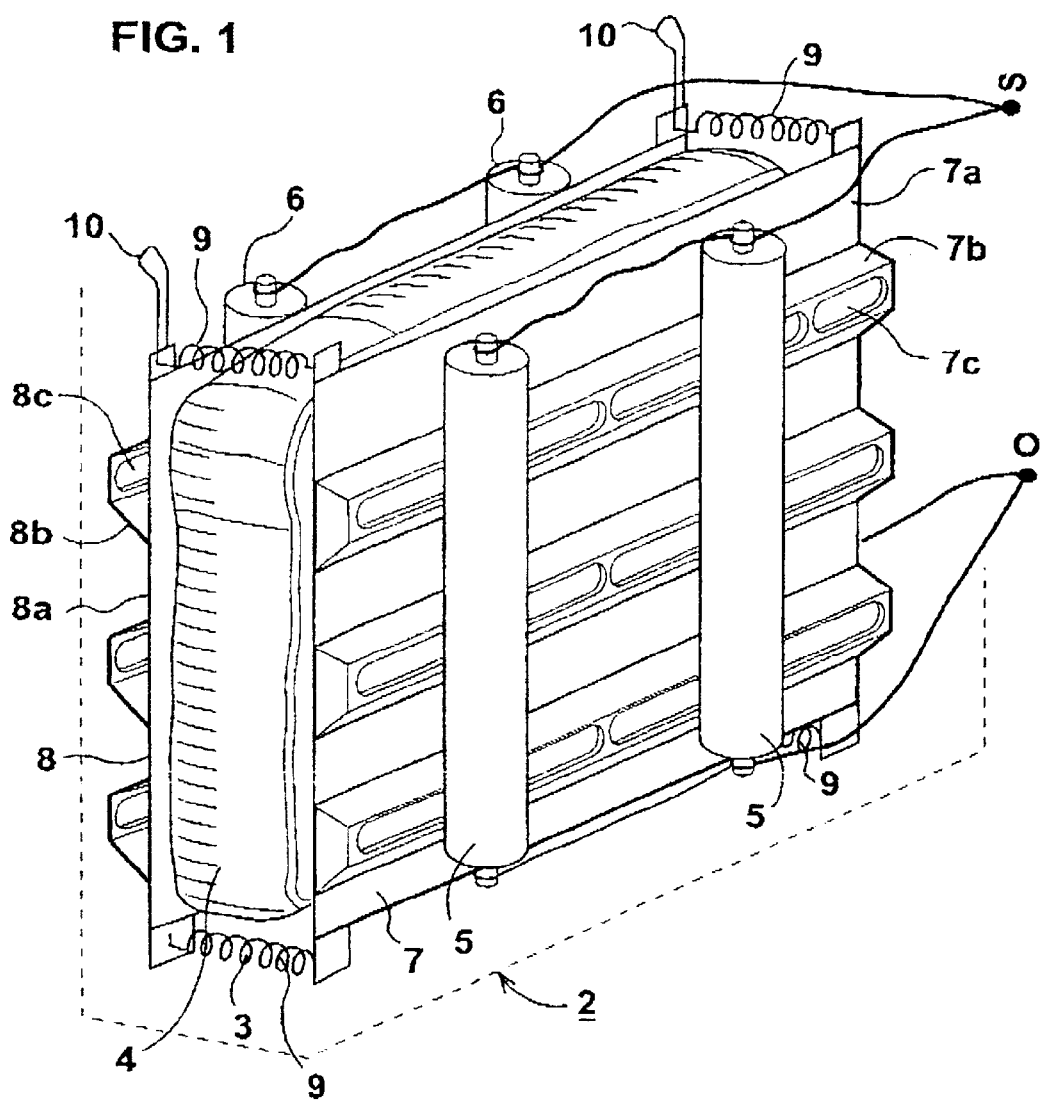
FIG. 1 is a three-dimensional view illustrating one form of heating appliance constructed in accordance with the present invention.
Figure 2:
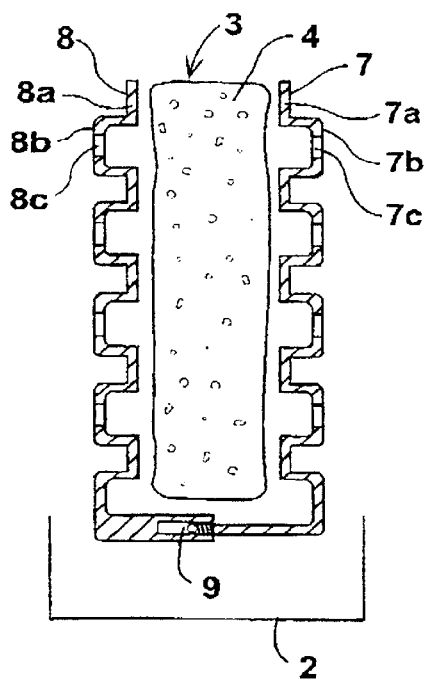
FIG. 2 is a partial sectional view more particularly illustrating the construction of the heat transfer plates in the heating appliance of FIG. 1.
Figure 3:
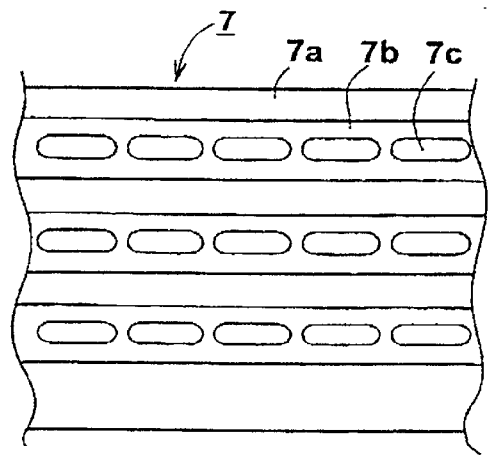
FIG. 3 is a side elevational view of FIG. 2.

The heating appliance illustrated in FIGS. 1–3 is a bread toaster, including a housing, schematically indicated at 2, defining a vertically-extending food article or toast compartment 3 for receiving a slice of bread 4 to be toasted. The appliance further includes a plurality of heater elements, in the form of lamps 5, located laterally on one side of compartment 3, and another plurality of heater lamps 6 located laterally on the opposite side of the compartment. The illustrated toaster further includes a pair of heat transfer plates 7, 8 between compartment 3 and the heater lamps 5 and 6. Heat transfer plates 7 and 8 are spaced from the heater lamps 5, 6, but are in contact with the slice of bread 4 when received within compartment 3.

Each heat-transfer plate, 7, 8, is made of metal, such as aluminum, copper, steel etc., and is blackened on the side facing the heating lamps 5, 6, to better absorb heat therefrom. In addition, each heat-transfer plate 7, 8, is of a corrugated construction.

Thus, each heat-transfer plate 7, 8 is formed with projecting surfaces 7a, 8a, to be brought into direct contact with the bread slice 4, when received within the compartment 3. Since these projecting surfaces 7a, 8a, directly contact the bread slice, the transfer heat by conduction to the bread slice. Projecting surfaces 7a, 8a, alternate with recessed surfaces 7b, 8b, which are spaced from the food article. The latter surfaces are formed with elongated openings 7c, 8c, for transferring heat to the food article by radiation and convection. Preferably, the total cross-section of the openings 7c, 8c is 20–40% of the total cross-section of the respective heat-transfer plate.

Figure 1A:
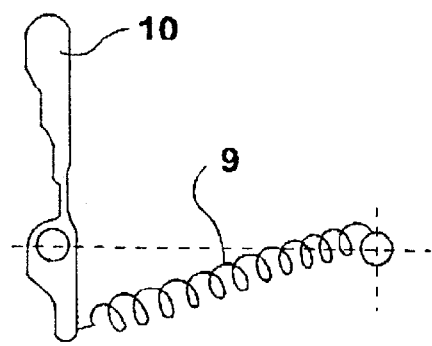
FIG. 1a more particularly illustrates a detail in the construction of the toaster of FIG. 1.

The appliance further includes springs, shown at 9 in FIG. 1, which bias the contacting surfaces of the heat-transfer plates 7, 8, against the bread slice 4. This spring bias may be manually adjustable by pivoting levers 10 to enable presetting the pressure applied by the heat-transfer plates to the bread slice. FIG. 1a more particularly illustrates how this adjustable bias may be achieved.

Figure 4:
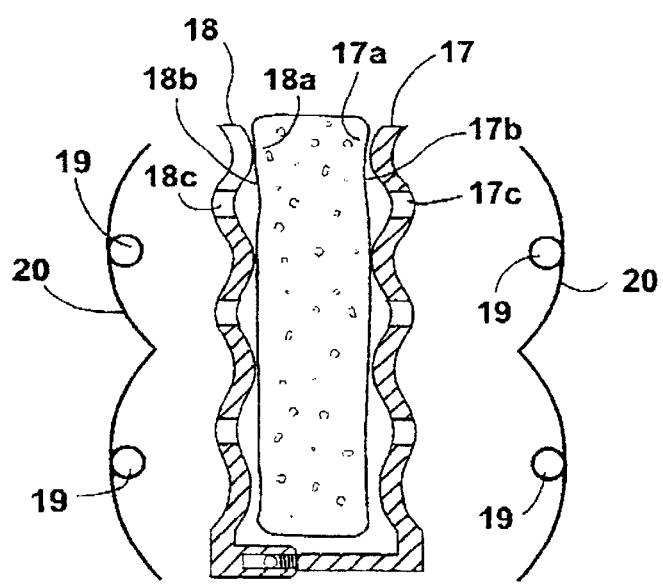
FIG. 4 is a sectional view, similar to that of FIG. 2, but illustrating a modification in the construction of the heating appliance.

FIG. 4 illustrates a variation wherein the heat-transfer plates, therein designated 17 and 18, respectively, are corrugated such that the projecting surfaces 17a, 18a, as well as the recessed surfaces 17b, 18b, alternating with surfaces 17a, 18a, are curved rather than flat, and are also formed with elongated openings 17c, 18c. FIG. 4 also illustrates the heater lamps 19, and reflectors 20, which reflectors would also be present in the appliance of FIGS. 1–3.

FIGS. 5–8 illustrate the invention embodied in bread toasters of the pop-up type, in which a slice of bread to be toasted is received on a pop-up stand movable to an upper loading-unloading position, and to a lower toasting position.

Figures 6, 7:
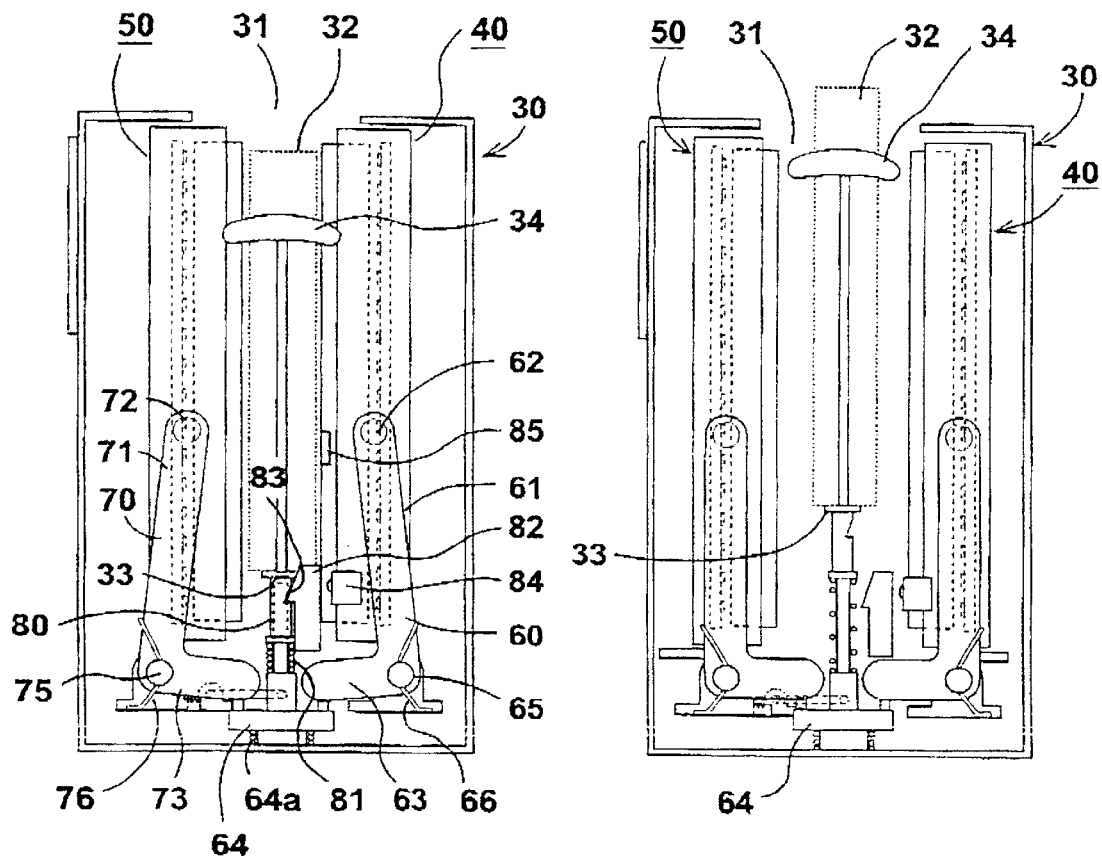
FIG. 6 is an end view diagrammatically illustrating the pop-up toaster of FIGS. 5 or 6 when the pop-up stand is in its lower toasting position.
FIG. 7 is a view similar to that of FIG. 7 but showing the pop-up stand in its upper loading-unloading position.

Thus, as shown particularly in FIGS. 6 and 7, the toaster includes a housing, generally designated 30, defining a toasting compartment 31 for receiving a slice of bread 32 on a pop-up stand 33 manually movable by a hand bar 34 to the lower toasting position (FIG. 6), and automatically returnable to its upper loading-unloading position (FIG. 7) after the bread has been toasted to a desired degree of darkness.

As shown particularly in FIGS. 6 and 7, one side of the toasting compartment 31 is provided with a heating body, generally designated 40; and the opposite side of the heating compartment is provided with a second heating body, generally designated 50. Both heating bodies are of the same construction, as best seen in FIG. 5.

Thus, as shown in FIG. 5, heating body 40 includes a mounting plate 41 with in turned flanges 42 at its opposite ends. Disposed within the flanged ends 42 is a resister element 43 constituted of a heat-resistant plate 43a and an elongated resister wire 43b wound back-and-forth to cover substantially the complete surface of plate 43a on the side thereof facing the bread slice 32 to be toasted.

Heating body 40 further includes a heat-transfer plate 44 carried between the flanged ends 42 of the mounting plate 41 on the side thereof facing the bread slice 32 to be toasted.

Heat-transfer plate 44 of the heating body 40, and the corresponding heat-transfer plate 54 of the heating body 50, may be of the same construction as heat-transfer plates 7 and 8 of FIGS. 1–3, or 17 and 18 of FIG. 4. Preferably, however, the corrugations in the heat-transfer plates 44 and 54 as shown in FIG. 5, extend vertically, rather than horizontally, to define vertically extending projecting surfaces 44a to contact the bread slice and thereby to transfer heat thereto by conduction, and vertically-extending recess surfaces 44b formed with elongated openings 44c for transferring heat to the bread slice by radiation and convection. As also described above with respect to FIGS. 1–4, the surfaces of the heat-transfer plates 44, 54, facing their respective heating elements (e.g., heating wire 43b) are blackened to better absorb the heat from the heating elements.

The two heating bodies 40, 50 are mounted on mechanism effective to bring their respective heat-transfer plates 44, 54 into contact with the opposite sides of the bread slice 32 being toasted, in the lower position of the pop-up stand 33 as shown in FIG. 6, and to move these heat-transfer plates out of contact with the bread slice in the upper loading-unloading position of the pop-up stand.

Thus, as shown in FIGS. 6 and 7, each of the mechanisms for mounting the heating bodies 40, 50 includes a bell crank lever 60, 70 having a first arm 61, 71 coupled by a pivotal coupling 62, 72, to their respective heating body 40, 50, and a second arm 63, 73 normally engageable with a platform 64 underlying, and in alignment with, the pop-up stand 33 receiving the bread slice 32. Each bell crank lever 60, 70 is pivotally mounted to the juncture 65, 75 of the two arms 61, 63 and 71, 73, and is urged, by a piano spring 66, 76, at the pivotal mounting, in the direction to bring its respective heat-transfer plate 44, 54, into light contact with the bread slice being toasted, in the lower toasting position of the pop-up stand 33. The two bell cranks are latched in this toasting position by a mechanism to be described below, which mechanism is effective to automatically release the latch, upon sensing a predetermined darkness condition in the slice of bread being toasted. When this occurs the bread slice is moved to its upper position, and the heat-transfer plates 44, 54 are moved out of contact with the bread slice to permit loading or unloading thereof, as shown in FIG. 7.

The foregoing latching and releasing mechanism, as shown particularly in FIGS. 6 and 7, includes a mounting member 80 fixed to the popup stand 33 so as to be removable therewith; and a spring 81 interposed between the mounting member 80 and the platform 64 engaged by the two arms 63, 73 of the bell crank levers 60, 70. Spring 81 normally urges the pop-up stand 33, and thereby the bread slice 32 on it, to its upper position but is releasably retained in its lower position by a latch element 82 receivable within a notch 83 formed in mounting member 80 of the pop-up stand 33. Latch element 82 is normally biased (by a spring not shown) to seat within notch 83, and thereby to latch the pop-up stand in its lower position, but is movable to a releasing position by an electromagnet 84 under the control of a darkness sensor 85 sensing the darkness condition of the bread slice.

Platform 64 is mounted on a spring 64a to absorb the shocks when the bell crank levers 60, 70 are pivoted by the downward movement of the pop-up stand 33, as shown in FIG. 6.

Figure 8:
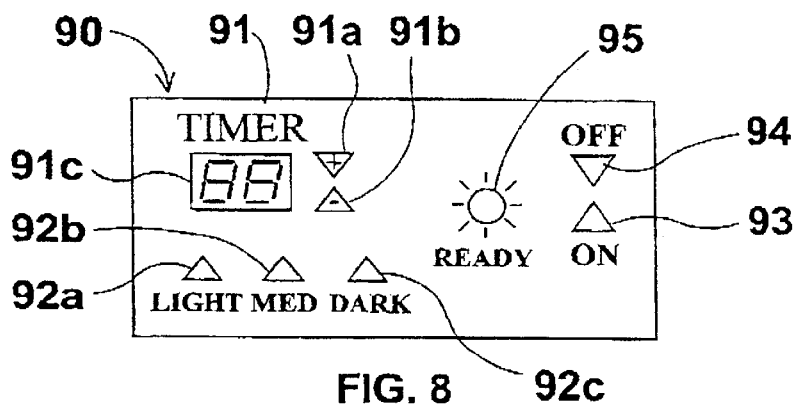
FIG. 8 illustrates the control panel that may be provided in the toaster.

FIG. 8 illustrates a control panel, generally designated 90, which may be provided such an electrical toaster. Such a control panel is provided with a presettable timer 91, including an up-button 91a, a down-button 91b and a display 91c; presettable darkness buttons 92a, 92b, 92c; an on-switch 93, an off-switch 94, and a Ready Indicator 95.

The toaster illustrated in FIGS. 5–8 operates as follows:

The pop-up stand 33 is normally in its upper position, shown in FIG. 7, for receiving the bread slice 32 to be toasted. After the bread slice has been inserted, the push bar 34 is depressed, whereupon the pop-up stand 33 is latched in its lower position, shown in FIG. 6, by latch element 82 received within notch 83. When the pop-up stand 33 is moved to this position, the platform 64 is slightly lowered by the mounting member 80 of the pop-up stand 33, thereby enabling the two bell crank levers 60, 70 to be pivoted by their respective piano springs 66, 76, to their inner positions as illustrated in FIG. 6, wherein their respective heat-transfer plates 44, 54 lightly engage the bread slice 32.

When the pop-up stand 33 is in this position, as illustrated in FIG. 6, the electrical heater wires of the heating bodies 40, 50 are energized to heat the respective sides of the bread slice 32. As described earlier, the projecting surfaces (e.g., 44a) of the heat-transfer plates 44, 54, being in direct contact with the bread slice, transfer the heat to the bread slice by conduction; whereas the recess surfaces (e.g., 44b) formed with the elongated openings (44c), transfer the heat to the bread slice by a radiation and convection.

When the bread slice has the darkness preset by buttons 92a–92c of the control panel 90, as sensed by the darkness sensor 85, electromagnet 84 is actuated to release the latch element 82, and thereby to permit spring 81 to automatically raise the pop-up stand 33, and the bread slice thereon, to the raised position shown in FIG. 7 for unloading. As the pop-up stand 33 rises, its mounting member 80 disengages from platform 64, thereby permitting its spring 64a to pivot the two bell crank levers 60, 70 to their normal positions, as shown in FIG. 6, wherein the heat-transfer plates 44, 54 of their respective heating bodies 40, 50 disengage from the sides of the bread slice 32 to permit removal of the toasted bread slice, and the reintroduction of another bread slice if desired.

FIG. 9 illustrates a modification in the construction of the toaster described above with respect to FIGS. 5–8. In this modification, the heating bodies, therein designated 140, 150 corresponding to bodies 40 and 50 in FIGS. 5–8, include heat-transfer panels 144, 154 of a flat construction, i.e., presenting flat surfaces, rather than corrugated surfaces, to the respective sides of the bread slice being toasted.

In all other respects, the toaster illustrated in FIG. 9 is of the same construction, and operates in the same manner, as the toaster described above with respect to FIGS. 5–8.

While the invention has been described with respect to several preferred embodiments, it will be appreciated that these are set forth merely for purposes of example, and that many other variations, modifications and applications of the invention may be made.

What is claimed is:

1. A food heating appliance, comprising:
   a food compartment for receiving a food article to be heated;
   at least one heating element located laterally of said food compartment for heating a food article therein;
   and a heat-transfer plate located between the food article compartment and said heating element;
   said heat-transfer plate being blackened to absorb heat from the heating element, and being of a corrugated construction having projecting surfaces to contact the food article when received in the compartment for transferring heat to the food article by conduction, alternating with recessed surfaces spaced from the food article and formed with openings for transferring heat to the food article by radiation and convection.

2. The appliance according to claim 1, wherein the appliance includes a spring for biasing said contacting surfaces of the heat-transfer plate against the food article.

3. The appliance according to claim 2, wherein said spring bias is manually adjustable.

4. The appliance according to claim 1, wherein said projecting surfaces and said recessed surfaces are substantially flat.

5. The appliance according to claim 1, wherein said projecting surfaces and said recessed surfaces are curved.

6. The appliance according to claim 1, wherein there are two of said heating elements and two of said heat-transfer plates located on the opposite sides of the food article compartment.

7. The appliance according to claim 6, wherein said food compartment is oriented vertically to receive a slice of bread to be toasted.

8. The appliance according to claim 7, wherein said food compartment includes a pop-up stand at its lower end for receiving the slice of bread to be toasted;
   said pop-up stand being movable to an upper loading-unloading position and to a lower toasting position;
   said heat-transfer plates being brought into contact with the slice of bread on the pop-up stand when the latter is in its lower position, and being moved out of contact with the slice of bread when the pop-up stand is in its upper position.

9. The appliance according to claim 8, wherein said heat-transfer plates are spring-urged against the slice of bread when the pop-up stand is in its lower position.

10. The appliance according to claim 8, wherein each heat-transfer plate is coupled to a first arm of a pivotal lever and is spring-urged into contact with the slice of bread in the lower position of the pop-up stand; said lever including a second arm actuatable by the pop-up stand for pivoting said lever to move the respective heat-transfer plate away from the slice of bread when the pop-up stand is in its upper position.

11. The appliance according to claim 10, wherein each of said levers is a bell crank lever having said first and second arms extending perpendicularly to each other and joined together at the pivotal mounting of the lever.

12. The appliance according to claim 11, wherein said bell crank lever is spring-urged by a spring applied at the pivotal mounting of the bell crank lever to urge its first arm to move the respective heat-transfer plate into contact with the slice of bread in the upper position of the pop-up stand.

13. The appliance according to claim 11, wherein said pop-up stand is urged to its upper position by a spring, said pop-up stand including a latch for latching the pop-up stand in its lower position, and a releasing mechanism for automatically releasing the latch upon sensing a predetermined darkness condition of the slice of bread being toasted.

14. The appliance according to claim 13, wherein said pop-up stand is mounted on a mounting member movable therewith to an upper position and a lower position with respect to a platform engaged by said second arm of each bell crank lever, said spring urging the pop-up stand to its upper position being interposed between the pop-up stand and said platform.

15. A bread toaster, comprising:
    a pop-up stand movable to an upper loading-unloading position and to a lower toasting position in a bread compartment for receiving a slice of bread to be toasted;
    a pair of heating elements located on opposite sides of said bread compartment for toasting a slice of bread on said pop-up stand;
    and a pair of heat-transfer plates on opposite sides of said bread compartment between the heating element thereat and the slice of bread to be toasted; said heat-transfer plates being brought into contact with the slice of bread on the pop-up stand when the pop-up stand is in its lower position, and being moved out of contact with the slice of bread when the pop-up stand is in its upper position.

16. The toaster according to claim 15, wherein said heat-transfer plates are blackened on the side facing the electrical heating elements.

17. The toaster according to claim 15, wherein said heat-transfer plates are spring-urged against the slice of bread when the pop-up stand is in its lower position.

18. The toaster according to claim 15, wherein each heat-transfer plate is coupled to a first arm of a pivotal lever and is spring-urged into contact with the slice of bread in the lower position of the pop-up stand; said lever including a second arm actuatable by the pop-up stand for pivoting said lever to move the respective heat-transfer plate away from the slice of bread when the pop-up stand is in its upper position.

19. The toaster according to claim 18, wherein each of said levers is a bell crank lever having said first and second arms extending perpendicularly to each other and joined together at the pivotal mounting of the lever.

20. The toaster according to claim 18, wherein said bell crank lever is spring-urged by a spring applied at the pivotal mounting of the bell crank lever to urge its first arm to move the respective heat-transfer plate into contact with the slice of bread in the upper position of the pop-up stand.

21. The toaster according to claim 18, wherein said pop-up stand is urged to its upper position by a spring, said pop-up stand including a latch for latching the pop-up stand in its lower position, and a releasing mechanism for automatically releasing the latch upon sensing a predetermined darkness condition of the slice of bread being toasted.

22. The toaster according to claim 21, wherein said pop-up stand is mounted on a mounting member movable therewith to an upper position and a lower position with respect to a platform engaged by said second arm of each bell crank lever, said spring urging the popup stand to its upper position being interposed between the pop-up stand and said platform.

23. The toaster according to claim 15, wherein said heat-transfer plates are of a corrugated construction having projecting surfaces to contact the slice of bread for transferring heat thereto by conduction, alternating with recess surfaces spaced from the slice of bread and formed with openings for transferring heat thereto by radiation and convection.

24. The toaster according to claim 15, wherein said heat-transfer plates are flat plates having flat surfaces brought into contact with the slice of bread being toasted.

\* \* \* \* \*